United States Patent [19]
Focke

[11] Patent Number: 5,348,440
[45] Date of Patent: Sep. 20, 1994

[54] APPARATUS FOR LOADING CARTONS ONTO PALLETS

[75] Inventor: Heinz Focke, Verden, Fed. Rep. of Germany

[73] Assignee: Focke & Co. (GmbH & Co.), Verden, Fed. Rep. of Germany

[21] Appl. No.: 877,079

[22] Filed: May 1, 1992

[30] Foreign Application Priority Data

May 1, 1991 [DE] Fed. Rep. of Germany ....... 4114215

[51] Int. Cl.⁵ .............................................. B65G 57/02
[52] U.S. Cl. .................... 414/792.9; 414/793; 901/7
[58] Field of Search ............... 414/744.1, 744.2, 744.3, 414/789.6, 792.1, 793, 736, 225, 797, 788.1, 792.9; 212/199, 204, 233; 901/7, 8, 40

[56] References Cited

U.S. PATENT DOCUMENTS

| | | | |
|---|---|---|---|
| 4,504,186 | 3/1985 | Richards | 414/792.9 |
| 4,527,936 | 7/1985 | Hartlieb | 414/744.2 |
| 4,978,274 | 12/1990 | de Groot | 414/744.3 |

FOREIGN PATENT DOCUMENTS

| | | | |
|---|---|---|---|
| 3577 | 8/1979 | European Pat. Off. | 414/744.2 |
| 1914569 | 8/1962 | Fed. Rep. of Germany | |
| 7118842 | 5/1971 | Fed. Rep. of Germany | |
| 2227835 | 1/1973 | Fed. Rep. of Germany | |
| 2434060 | 1/1976 | Fed. Rep. of Germany | |
| 2703208 | 8/1978 | Fed. Rep. of Germany | |
| 2439032 | 6/1981 | Fed. Rep. of Germany | |
| 3014735 | 10/1981 | Fed. Rep. of Germany | |
| 2711677 | 7/1982 | Fed. Rep. of Germany | |
| 3338565 | 7/1984 | Fed. Rep. of Germany | |
| 3613089 | 10/1987 | Fed. Rep. of Germany | |
| 3637114 | 5/1988 | Fed. Rep. of Germany | |
| 3720933 | 1/1989 | Fed. Rep. of Germany | |
| 9000381 | 8/1990 | Fed. Rep. of Germany | |
| 4001513 | 7/1991 | Fed. Rep. of Germany | |
| 1136886 | 5/1987 | France | 414/792.1 |
| 237782 | 9/1990 | Japan | 901/8 |
| 95017 | 4/1991 | Japan | 901/7 |
| 648806 | 4/1985 | Switzerland | 901/8 |

*Primary Examiner*—Michael S. Huppert
*Assistant Examiner*—R. B. Johnson
*Attorney, Agent, or Firm*—Sughrue, Mion, Zinn, Macpeak & Seas

[57] ABSTRACT

An apparatus for loading cartons (11, 12) which arrive on feed conveyors (13, 14) onto pallets (10) is disclosed. A palletizer (15) is used for loading the catons (11, 12) arriving on feed conveyors (13, 14) onto the pallet (10). This palletizer (15) lifts the cartons (11, 12) off the feed conveyor (13, 14) with a suction head (27) and conducts upward and downward movements as well as pivoting movements in order to deposit the cartons (11, 12) on the pallet (10). To increase the capacity of the palletizer (15), it is equipped with two independently operating articulated arms (16, 17) which both load cartons (11, 12) onto a pallet (10). As a result, the capacity of the palletizer (15) is increased while the operating velocity of the articulated arms (16, 17) remains invariable.

8 Claims, 2 Drawing Sheets

APPARATUS FOR LOADING CARTONS ONTO PALLETS

BACKGROUND OF THE INVENTION

The invention relates to an apparatus for loading cuboid articles, especially cartons, onto pallets by means of a palletizer with an articulated arm which is movable up and down and pivotable and with a suction head or the like which is arranged on the end of the articulated arm, the cartons being feedable to the palletizer by at least one feed conveyor.

Cartons of different shapes and sizes are stacked on pallets for transport and storage. The pallets are loaded by automatically operating palletizers which comprise a movable articulated arm with a suction head or another holding means for engaging the cartons. In order to load the pallets, the palletizer is positioned relative to the pallet which is to be loaded in such a way that the articulated arm can engage the cartons which are delivered by a feed conveyor and can load them onto the pallet.

It is known from DE-OS 36 13 089 to increase the capacity of a palletizer by delivering the cartons to be loaded via two separate feed conveyors with vertically adjustable platforms. The cartons are moved from the delivery plane to a take-up plane by means of the platform. As a result, the time which the articulated arm of the palletizer requires for its lifting movement in the course of the loading operation is reduced, which increases the capacity of the palletizer. By delivering the cartons which are to be loaded via two separate feed conveyors, the waiting time between the individual loading operations is reduced.

SUMMARY OF THE INVENTION

The invention is based on the object to develop and improve a palletizer of the above mentioned type in such a way that it is possible to increase the capacity as regards loading the cartons or the like from a feed conveyor onto a pallet without increasing the operating velocity of the movements of the palletizer at the same time.

According to the invention, this object is attained by providing the palletizer with two articulated arms which are movable independently of one another.

By providing a palletizer with two independently movable articulated arms, the capacity of the palletizer expediently increases while the operating velocity of the two palletizer arms remains the same as that of a single-arm palletizer.

In a preferred embodiment of the invention, the palletizer with two articulated arms is associated with two spaced feed conveyors for the articles or cartons. Each articulated arm serves one of the feed conveyors. Furthermore, the palletizer of this embodiment is associated with a pallet which is to be loaded by both articulated arms.

According to another feature of the invention, the pivoting range of the articulated arms can be delimited by adjustable mechanical or electric stop means. The stop means are set in such a way that, in the case of variable operating ranges or pivoting angles of the articulated arms, the operating ranges do not overlap and the articulated arms do not obstruct one another. When both articulated arms load a common pallet, the stop means are expediently set in such a way that each articulated arm loads one half of the pallet.

According to the invention, each articulated arm of the palletizer is mounted with a guide block on an upright post so as to be movable up and down. Additionally, there is provided a central supporting column, preferably having a rectangular or quadrate cross section. The guide blocks of the articulated arms are supported and movable at opposite sides of the supporting column. According to another feature of the invention, the supporting means of the palletizer which have been described in the foregoing are anchored in a common base.

Further features of the invention relate to the structure of the palletizer and to the apparatus for handling the articles.

BRIEF DESCRIPTION OF THE DRAWINGS

An exemplary embodiment of the apparatus according to the invention will be described below in detail with reference to the drawings, in which.

DESCRIPTION OF A PREFERRED EMBODIMENT

Figure 1:
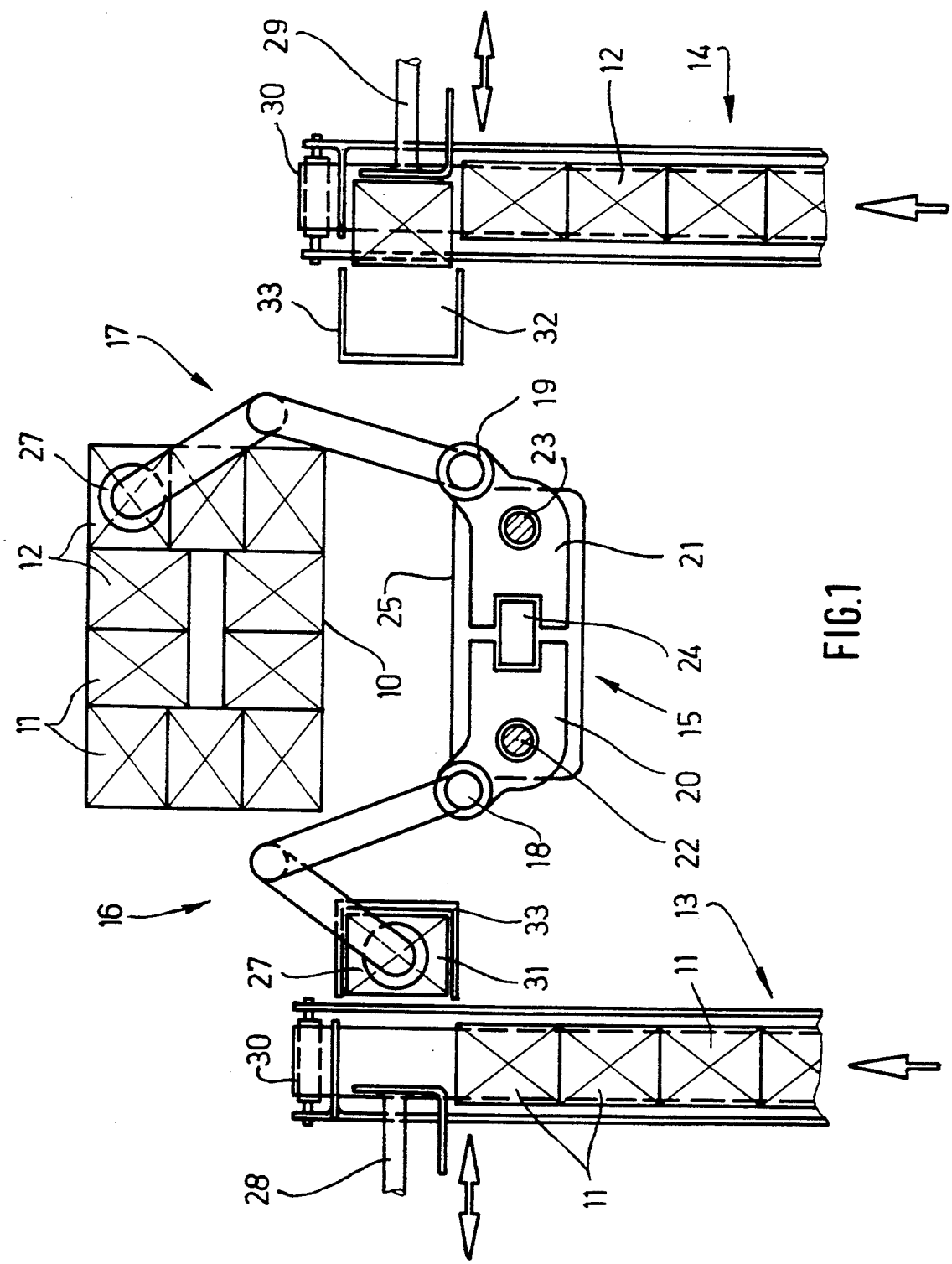
FIG. 1 is a plan view of an apparatus for loading pallets.
Figure 2:
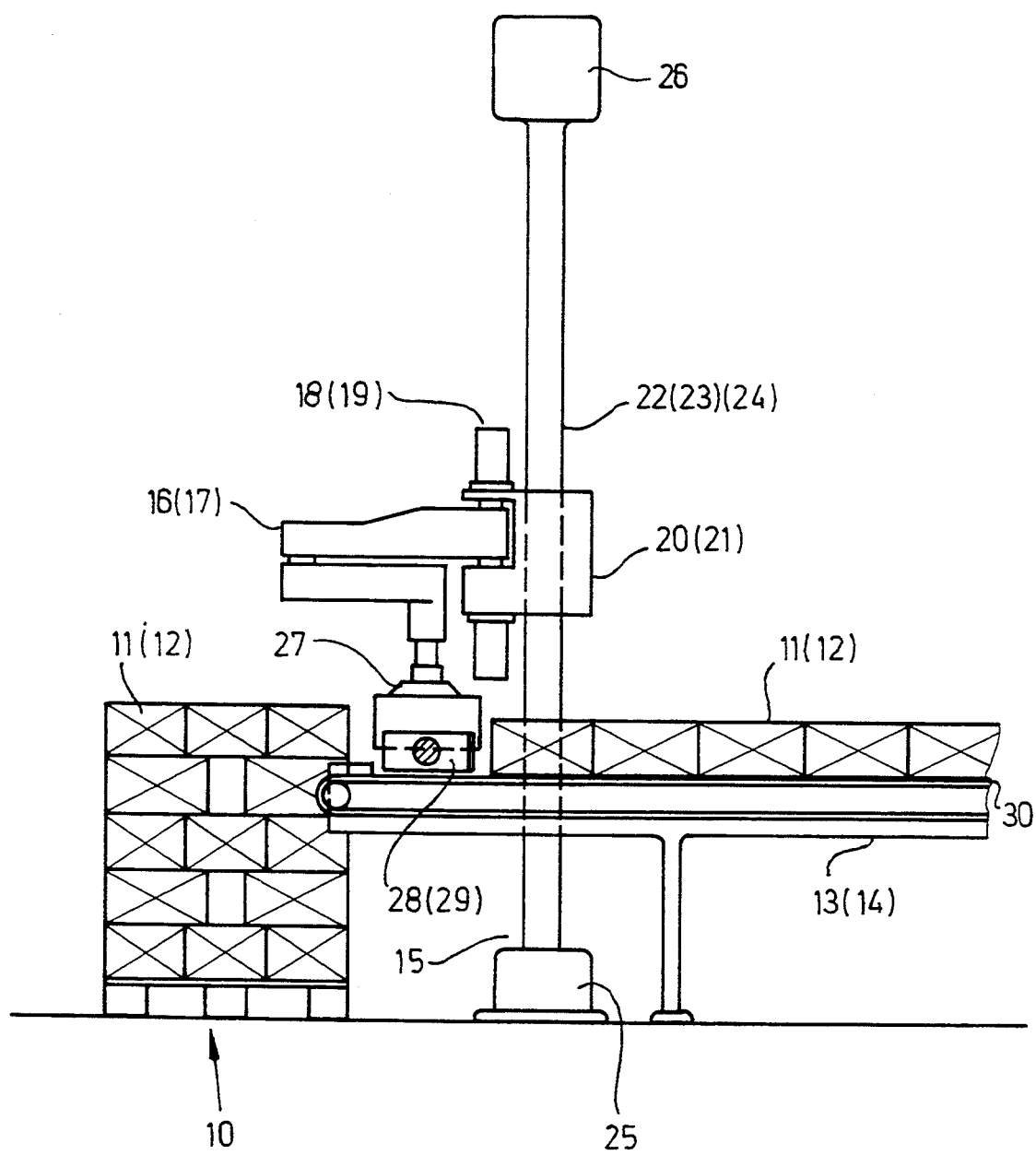
FIG. 2 is a side view of the apparatus of FIG. 1 which, in order to simplify this representation, only illustrates only one articulated arm.

The exemplary embodiment illustrated in the drawings is directed to loading cuboid articles, particularly cartons 11, 12 onto a single pallet 10. These cartons may have the same or different contents.

In the present case, the cartons 11, 12 are fed to the pallet 10 by two parallel spaced feed conveyors 13, 14. The pallet 10 is centrally arranged between the feed conveyors 13, 14. A common palletizer 15 serves for lifting the cartons 11, 12 from the feed conveyors 13, 14 and for depositing them on the pallet 10. In this embodiment, the palletizer 15 is centrally positioned between the feed conveyors 13, 14.

The outstanding feature of the palletizer 15 is that it is equipped with two articulated arms 16, 17. These arms are movable independently of one another with respect to their vertical movements as well as their pivoting movements.

Each articulated arm 16, 17 is attached to a mounting, particularly a guide block 20, 21, via a (first) joint 18, 19. This guide block 20, 21 is moved up and down with the articulated arm 16, 17, but it is mounted non-rotatably. Each guide block 20, 21 is mounted so as to be movable up and down, in this embodiment in a sliding manner, on an upright post 22, 23 which in the present case has a circular cross section. Furthermore, the guide blocks 20, 21 are supported on a common supporting column 24 with their confronting sides. In the present embodiment, this supporting column 24 has a rectangular cross section. By means of a U-shaped design of their confronting sides, each of the guide blocks 20, 21 are supported on the supporting column 24 with a lateral guide. In the region of this guide, the guide blocks 20, 21 are provided with rollers which in each case contact two opposite sides of the supporting column 24.

The upright supporting means of the palletizer 15, i.e. the two upright posts 22, 23 and the supporting column 24 are anchored with their bottom ends in a common base 25. In the present embodiment, the top ends of the posts 22, 23 and the supporting column 24 are connected to one another by means of a crosspiece 26.

The articulated arms 16, 17 have a conventional structure as regards the design of the joints and the drive. A carrier means for the articles, in the present case a suction head 27, is located at the free ends of the articulated arms 16, 17. The suction head engages the cartons 11, 12 at their top side and transports them.

Each articulated arm 16, 17 is assigned to a feed conveyor 13, 14. In the present case, the cartons 11, 12 which are, in the direction of transport, located in front on the feed conveyors 130 14 are pushed off a conveying belt 30 in the transverse direction by means of a transversely movable pusher 28, 29 onto a platform 31, 32 which is arranged next to each feed conveyor 13, 14. The carton 11, 12 which is held ready on this platform 31, 32 is lifted off the platform by the associated articulated arm 16, 17. The platforms 31, 32 are delimited on three sides by stops 33.

The operating range of the articulated arms 16, 17 can be adjusted by means of the adjustable stop means which are provided for each articulated arm 16, 17. If both feed conveyors 13, 14 continuously deliver cartons 11, 12—as it is the case in the present embodiment—, each articulated arm 16, 17 is set to load one half of the pallet 10. But would also be possible to unevenly distribute the surface of the pallet 10 which is to be served by each articulated arm 16, 17.

I claim:

1. An apparatus for loading cuboid articles onto a pallet by means of a palletizer (15), said palletizer comprising:
    two articulated arms (16, 17);
    two guide blocks (20, 21);
    a vertically extending supporting column (24);
    a pair of joints (18, 19); and
    a pair of vertically extending posts (22, 23);
    wherein each joint (18, 19) pivotally mounts one of said articulated arms (16, 17) on a respective one of said guide blocks (20, 21) for pivotal movement of the articulate arm in a horizontal plane;
    wherein each guide block (20, 21) is movable up and down on a respective one of said posts (22, 23);
    wherein both guide blocks (20, 21) are mounted on said supporting column (24) for up and down vertical movement therealong; and
    wherein said supporting column (24) has a cross-sectional configuration which prevents pivoting movements of said guide blocks in the horizontal plane.

2. The apparatus according to claim 1, wherein the posts (22, 23) and the supporting column (24), which is disposed between said posts, are connected to one another at upper ends thereof by a common upper crosspiece (26).

3. The apparatus as claimed in claim 1 or 2, wherein the posts (22, 23) of the articulated arms (16, 17) are anchored in a common base (25).

4. The apparatus as claimed in claim 1 or 2, wherein the supporting column (24) has a quadrate cross section, and wherein the guide blocks (20, 21) of the articulated arms (16, 17) are supported on the supporting column (24) at two oppositely situated sides of the supporting column (24).

5. The apparatus as claimed in claim 4, wherein the guide blocks (20, 21) of the articulated arms (16, 17) each partially embrace the supporting column (24) to permit the guide blocks vertically to pass one another on the supporting column.

6. The apparatus as claimed in claim 5, wherein the supporting column (24) is centrally anchored in the base (25).

7. The apparatus as claimed in claim 1 or 2, further comprising two band-shaped feed conveyors (13, 14) for feeding the articles (11, 12) which are to be palletized to the palletizer (15), said two band-shaped feed conveyors (13, 14) being separately arranged in parallel opposite one another, and wherein each feed conveyor (13, 14) is associated with one articulated arm (16, 17) of the palletizer (15) so that the one articulated arm loads onto the pallet articles from its associated feed conveyor.

8. The apparatus as claimed in claim 7, wherein each feed conveyor (13, 14) is associated with a respective delivery table which comprises:
    a platform (31, 32) which is delimited on three sides by stops (33); and
    a pusher (28, 29) which is located opposite the platform (31, 32) and which has a direction of movement extending transverse to the direction of movement of the feed conveyor (13, 14) in order to push the cartons (11, 12) from the feed conveyor (13, 14) onto the platform (31, 32).

* * * * *